March 21, 1950     G. L. WHITE     2,501,555
SPRAYING ATTACHMENT FOR WEED CONTROL Filed Nov. 26, 1947     2 Sheets-Sheet 1

Inventor
Godfrey Llewellyn White

By *Clarence A. O'Brien and Harvey B. Jacobson*
Attorneys

March 21, 1950 G. L. WHITE 2,501,555
SPRAYING ATTACHMENT FOR WEED CONTROL
Filed Nov. 26, 1947 2 Sheets-Sheet 2

Godfrey Llewellyn White,
*Inventor*

By *Clarence A. O'Brien
and Harvey B. Jacobson*
*Attorneys*

Patented Mar. 21, 1950

2,501,555

UNITED STATES PATENT OFFICE 2,501,555

SPRAYING ATTACHMENT FOR WEED CONTROL

Godfrey Llewellyn White, Osceola, Ark.

Application November 26, 1947, Serial No. 788,102

3 Claims. (Cl. 299—30)

This invention appertains to novel and useful improvements in devices for use in conjunction with various agricultural operations.

An object of this invention is to spray selected portions of desired plants or other flora and also spray adjacent vegetation with certain chemicals, particularly aromatic spirits of a naphtha type petroleum constituent, thereby destroying undesired vegetation.

Another object of this invention is to retain a pair of runners resiliently, having the same depending from a suitable prime mover such as a tractor, and adjustably support conduits for emitting the aforementioned chemical in selected areas.

Another object of this invention is to resiliently bias the runners so that the rearward portions thereof firmly engage the ground, thereby retaining the nozzles associated with the rear portions of the runners, at a selected height from the grade line.

Another purpose of this invention is to provide improved distributing means for spraying the stems of certain types of plants along with the adjacent undesired vegetation.

Another purpose of this invention is to thin rows of plants, such as cotton, tobacco, beets, etc.

A still further purpose of this invention is to provide improved means for carrying out the aforementioned functions, which means is extremely simple in construction.

Ancillary objects and features of novelty will become apparent to those skilled in the art, in following the description of the preferred forms of the invention, illustrated in the accompanying drawings, wherein.

This invention has been conceived and developed to provide an improved apparatus for carrying out a novel method of killing weeds and other undesirable vegetation adjacent many types of plants, such as cotton, tobacco and many others. By utility of the present invention, thinning operations on farm lands may also be effected. As is well known, with certain types of crops the embryo or very small plants must be exterminated or otherwise destroyed in order to permit adjacent plants to thrive. The method of extermination utilized herewith is the spraying of the leaves or foliage of the plants with certain types of aromatic spirits, derived from a petroleum base. It has been found by extensive experimentation that if the stems of the plants are sprayed with this material or product, the associated plant remains healthy and is not destroyed. However, if the spray is directed to the leaves or foliage thereof, the plant will in due course (very shortly) become withered and cease to thrive.

Means for controllably spraying plants so that the stems solely will be treated is provided. This means or apparatus for carrying out the improved function or operation is an especially provided pair of runners with various appurtenances associated therewith.

Figure 1:
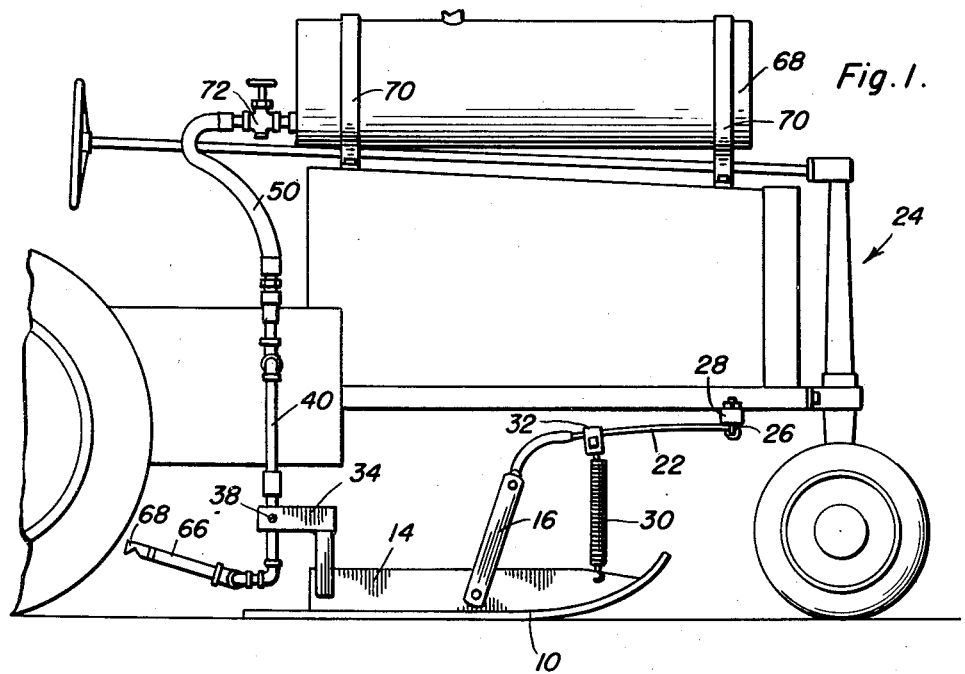
Figure 1 is an elevational side view of the preferred form of the invention, showing the same attached to a conventional tractor.
Figure 2:
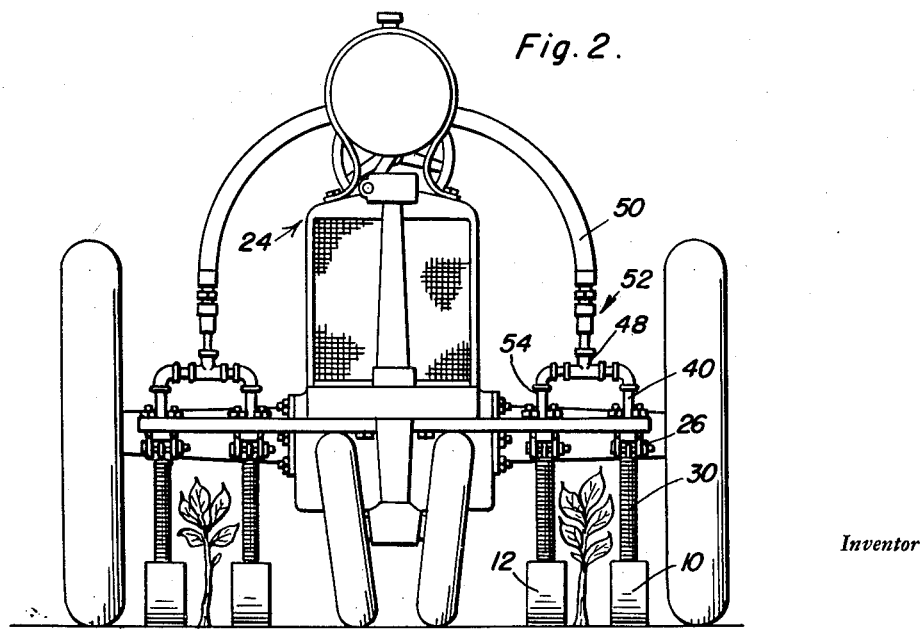
Figure 2 is a front view of the invention shown in Figure 1, showing the same in use.
Figure 3:
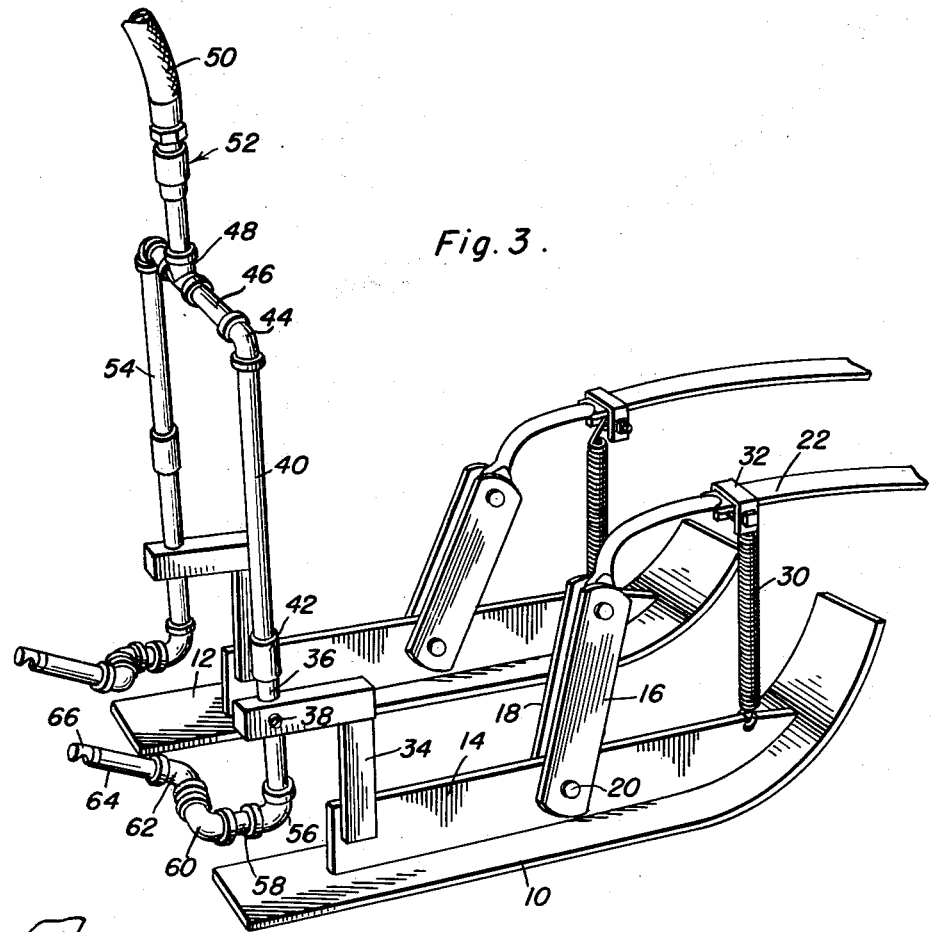
Figure 3 is a perspective view of one form of the present invention.
Figure 4:
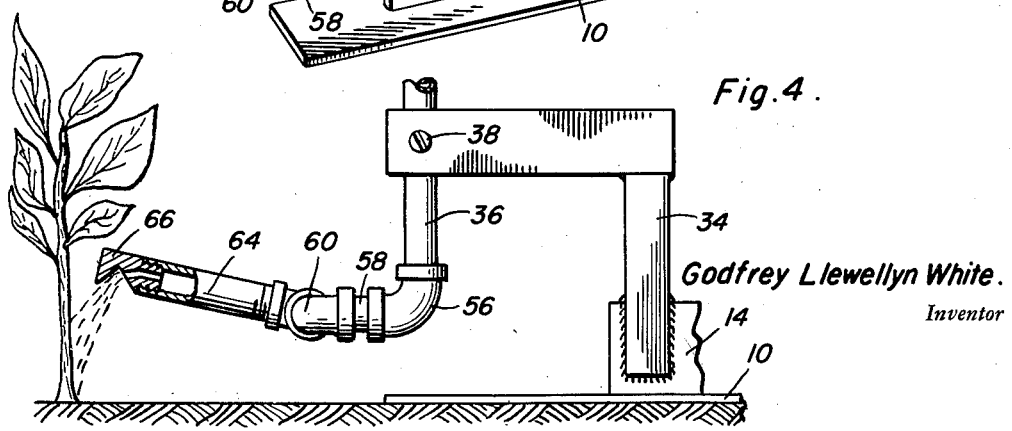
Figure 4 is an enlarged fragmentary elevational view of the chemical emission portions of the invention, showing the same applying a selected chemical to the stem of a plant.

Reference is now made primarily to Figure 3 wherein a pair of runners 10 and 12 respectively is illustrated. Each of the said runners is identical in construction, and therefore the runner 10 will be described in detail, necessarily leading to a complete understanding of the structure of the companion runner 12. The said runner 10 has a fin 14 secured thereto and a pair of plates 16 and 18 respectively are pivoted to the said fin through the medium of a suitable, conventional pin 20. A leaf spring or other suitable resilient means 22 is rigidly secured to the terminal portions of the said plates 16 and 18.

This leaf spring is attached to a suitable portion of a tractor, generally indicated at 24, by means of a U-bolt 26 and block 28. Of course, the U-bolt extends through the block and through a suitable portion of the said tractor 24, clamping the bent end of the said spring 22 therebetween.

Means for normally urging or biasing the trailing edge of the said shoe 10 toward the ground is provided. This means is preferably a coil spring 30 which is attached to a suitable bracket 32, adjustably positioned on the said leaf spring 22. The opposite end of the said spring 30 is secured to the said fin 14 by means of a suitable aperture provided therein.

It is essential that the rear or trailing edge of the said runners 10 and 12 respectively be constantly urged toward the ground in order to preserve the space or distance from the emission portions of the nozzles to be described hereinafter, and the ground. A bracket 34 is secured to the said fin 14 and has an aperture therethrough. This aperture receives a conduit 36 adjustably therein. A suitable set screw or the like, 38 extends through the said bracket and frictionally engages the said conduit 36, whereby the said conduit may be adjustably received in the bracket.

A second section or conduit 40 is secured to the said conduit 36 by means of a suitable conventional sleeve coupling 42. Then, an elbow 44 is secured to the said conduit 40 for the purpose of connecting a header 46 thereto. The said header 46 has a T-coupling 48 therein, whereby a flexible hose 50 may be operatively associated with the said header 46 through the medium of conventional coupling members 52.

The said header 46 has a pipe 54 associated therewith which is the counterpart of the said conduit 40. Of course, this last mentioned pipe 54 communicates with and is associated with the second runner 12, identical to the said runner 10.

An elbow 56 is secured to the free end of the said conduit 36 and a short length of pipe 58 is secured and is associated with the said elbow 56. Then, another elbow 60 is secured to the said short length of pipe 58 for the purpose of receiving a further elbow 62 therein. A nozzle 64 having a baffle 66 associated therewith is provided in association with the last mentioned elbow 62. This baffle 66 directs a flow of fluid toward the ground, for the purpose of preventing the fluid from impinging on the leaves of a plant.

A suitable means for retaining a supply of chemicals is provided. This suitable means may be a tank 68 connected to a suitable tractor 24 through the medium of conventional straps 70. Of course, a valve 72 may be associated with the flexible tube 50 for selectively controlling the emission of fluid from the said tank. A conventional pump may be used in association with the said tank for maintaining the fluid therein under pressure.

Further, by utility of the present it is quite apparent that by certain minor adjustments, the conduits 40 and 54 respectively may be raised relative to the ground pressing portions of the runners 10 and 12 respectively thereby spraying not only the undesired flora but also the leaves of the desired vegetation or plants, thereby exterminating both. By this means thinning operations may be effected on and in association with fields of cotton, tobacco and many other types of plants. The tractor bearing the present invention may be actuated in a field of such vegetation first in one direction and then in the opposite or transverse direction thereby leaving only rows of desired plants of such proportions of proximity that they will thrive.

In many types of planting there is provided hills or rows, having the plants at the apex of the small hills. The said runners 10 and 12 are then adapted to straddle these hills thereby rendering the undesired vegetation exterminating operation relatively simple and safe. Through this medium substantially none of the aromatic spirits will impinge upon the stems, which would anyway be harmless, but also the leaves or other vulnerable spots.

It is apparent that certain variations and modifications may be made without departing from the spirit of the invention. Accordingly, limitation is sought only in accordance with the scope of the following claims.

Having described the invention, what is claimed as new is:

1. An apparatus for applying liquid to the stalks of plants comprising a vehicle having a liquid supply tank, a discharge conduit extending from said tank, a nozzle secured to said conduit, a pair of leaf springs secured to said vehicle, a pair of runners having leading and trailing ends, means carried by the runners adjacent said trailing ends adjustably supporting said conduit, means intermediate the leading and trailing ends of said runners pivotally fixing said leaf springs to said runners, and springs reacting on said leaf springs and the leading ends of said runners constantly lifting the leading ends of said runners thereby pressing the trailing ends of said runners downwardly and correspondingly lowering said nozzles.

2. An apparatus for applying a liquid to the stalks of a plant comprising a runner having a leading and trailing end, a conduit leading to a liquid supply tank, a nozzle carried by said conduit, means for retaining said nozzle in adjusted vertical position on the trailing end of said runner, a link pivoted at its lower end to said runner intermediate the ends of the latter, a first resilient means securing the upper end of said link to a prime mover, and a second resilient means interconnecting said first resilient means and the leading end of said runner constantly lifting the leading end of said runner and lowering the trailing end thereof.

3. The combination of claim 2 wherein said first resilient means is a leaf spring.

GODFREY LLEWELLYN WHITE.

REFERENCES CITED

The following references are of record in the file of this patent:

UNITED STATES PATENTS

| Number | Name | Date |
|---|---|---|
| 559,042 | Potter | Apr. 28, 1896 |
| 668,950 | Brakeley et al. | Feb. 26, 1901 |
| 977,631 | Hopper | Dec. 6, 1910 |
| 1,526,642 | Nissley | Feb. 17, 1925 |
| 1,998,856 | Towt | Apr. 23, 1935 |
| 2,210,346 | Stayton | Aug. 6, 1940 |
| 2,246,866 | Stribbling et al. | June 24, 1941 |
| 2,327,204 | McLemore | Aug. 17, 1943 |
| 2,391,027 | McLemore | Dec. 18, 1945 |